United States Patent
Lehto et al.

(10) Patent No.: US 10,196,140 B2
(45) Date of Patent: Feb. 5, 2019

(54) METHODS FOR SEPARATING ROTOR BLADE CUFFS FROM ROTOR BLADE BODIES

(71) Applicant: Sikorsky Aircraft Corporation, Stratford, CT (US)

(72) Inventors: Ryan Lehto, Crowley, TX (US); Eric C. Boyle, Haslet, TX (US); Sven R. Lofstrom, Irving, TX (US); David Littlejohn, Haslet, TX (US)

(73) Assignee: SIKORSKY AIRCRAFT CORPORATION, Stratford, CT (US)

( * ) Notice: Subject to any disclaimer, the term of this patent is extended or adjusted under 35 U.S.C. 154(b) by 309 days.

(21) Appl. No.: 15/097,134

(22) Filed: Apr. 12, 2016

(65) Prior Publication Data

US 2017/0291724 A1 Oct. 12, 2017

(51) Int. Cl.
| | | |
|---|---|---|
| *F01D 25/28* | (2006.01) | |
| *B64C 27/46* | (2006.01) | |
| *B25B 27/28* | (2006.01) | |
| *B64C 27/48* | (2006.01) | |
| *B64F 5/10* | (2017.01) | |
| *B64F 5/40* | (2017.01) | |

(52) U.S. Cl.
CPC ............ *B64C 27/46* (2013.01); *B25B 27/28* (2013.01); *B64C 27/48* (2013.01); *B64F 5/10* (2017.01); *B64F 5/40* (2017.01); *F01D 25/285* (2013.01); *F05D 2230/70* (2013.01); *Y10T 29/49318* (2015.01)

(58) Field of Classification Search
CPC ... B64C 27/46; B64F 5/40; B64F 5/10; Y10T 29/53983
See application file for complete search history.

(56) References Cited

U.S. PATENT DOCUMENTS

| | | |
|---|---|---|
| 5,655,883 A | 8/1997 | Schilling |
| 6,578,265 B2 | 6/2003 | Boschet et al. |
| 7,399,159 B2 | 7/2008 | Matheny et al. |
| 7,762,783 B2 | 7/2010 | Cairo et al. |
| 2005/0109816 A1 | 5/2005 | Swartzbeck et al. |
| 2005/0141995 A1* | 6/2005 | Logan .................. B64C 27/473 416/134 A |
| 2013/0165024 A1* | 6/2013 | Araujo ................... B24C 1/086 451/75 |
| 2014/0294594 A1 | 10/2014 | Spoonire et al. |

* cited by examiner

*Primary Examiner* — Sarang Afzali
*Assistant Examiner* — Ruth G Hidalgo-Hernandez
(74) *Attorney, Agent, or Firm* — Cantor Colburn LLP

(57) ABSTRACT

A rotor blade disassembly method includes applying spanwise support to a rotor blade body and heating a bond disposed on an end of the rotor blade body. The method also includes removing the spanwise support from the rotor blade body and exerting shear stress on the bond using weight of the rotor blade body. A blade disassembly system is also described.

13 Claims, 8 Drawing Sheets

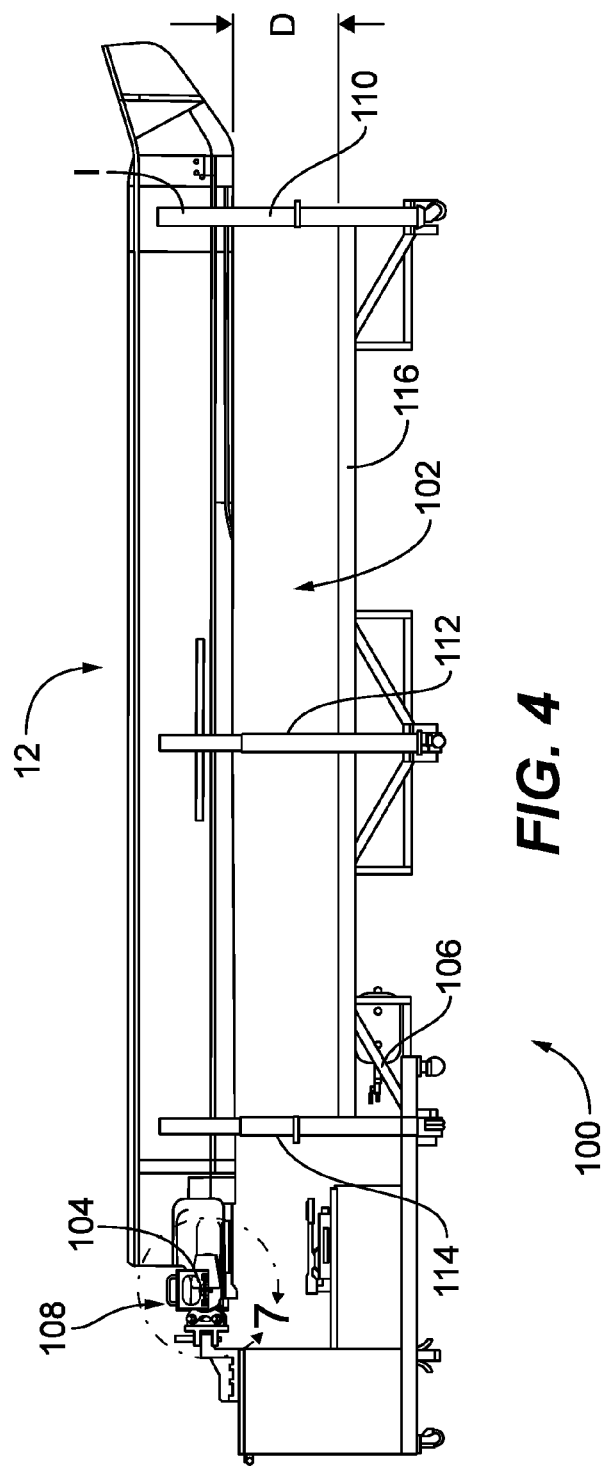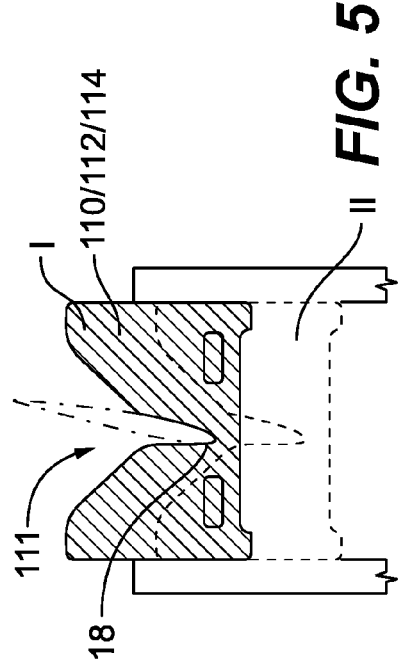

METHODS FOR SEPARATING ROTOR BLADE CUFFS FROM ROTOR BLADE BODIES

BACKGROUND OF THE INVENTION

1. Field of the Invention

The present disclosure relates to rotor blades, and more particularly to disassembling rotorcraft rotor blades.

2. Description of Related Art

Rotorcrafts commonly include rotor systems to generate lift and/or provide anti-torque thrust. The rotor system typically includes one or more rotor blades connected to a hub by a coupling structure the assembly thereby being supported for rotation about a rotation axis and providing lift and/or thrust to the rotorcraft. As the rotor blades rotate about the rotation axis, the rotation exerts centrifugal force on the rotor blade. The rotor blade transfers the centrifugal force to the hub through the coupling structure, which is typically configured to receive the load from the rotor blade through an interface defined between the coupling structure and the rotor blade.

In some rotor systems, such as those where the coupling structure is a rotor blade cuff, a bond disposed between the coupling structure and the rotor blade transfers the load between the rotor blade and the coupling structure. While satisfactory for maintaining the mechanical integrity of the rotor blade assembly while generating lift or applying thrust to the rotorcraft, disassembly of the rotor blade assembly can require breaking the bond between the coupling assembly the rotor blade. Breaking the bond between the blade body and the rotor blade coupling without disturbing the rotor blade surface and underlying structure can simplify repair of the blade.

Such conventional methods and systems have generally been considered satisfactory for their intended purpose when done successfully, but also have a higher likelihood of damaging the adjoining composite structure in the process. However, there is a need in the art for improved methods for separating blade cuffs from blade bodies. The present disclosure provides a solution for this need.

SUMMARY OF THE INVENTION

A rotor blade disassembly method includes fixing an end of a rotor blade body, applying spanwise support to a rotor blade body, and heating a bond disposed on an end of the rotor blade body. The method also includes removing the spanwise support from the rotor blade body and exerting shear stress on the bond using weight of the rotor blade body.

In certain embodiments, the applying spanwise support to the rotor blade body includes receiving the rotor blade in a blade cradle. Applying spanwise support to the rotor blade body can include orienting a chord defined by the rotor blade body vertically relative to gravity. Applying spanwise support to the rotor blade body can include engaging the rotor blade body using an inboard support, a mid-span support, and an outboard support of the blade cradle. The method can also include applying endwise support to the rotor blade body.

In accordance with certain embodiments, the disassembly method can include seating a blade cuff coupled to an end of the rotor blade body in a blade cuff seat. The method can include displacing the blade cradle relative to the rotor blade body from a continuous support position to a cantilevered support position. The method can also include pivoting the rotor blade relative to the blade cuff using the weight of the rotor blade body. Axially opposed forces can be applied against the blade cuff and the rotor blade body. The axially opposed forces can displace the blade cuff relative to the rotor blade body longitudinally relative to the blade body.

It is also contemplated that, in accordance with certain embodiments, the method can include removing one or more fasteners connecting the blade cuff to the rotor blade body. Heating the bond can include applying a first amount of the heat to an inboard end of a blade cuff coupled to the rotor blade body by the bond and applying a second amount of heat to an outboard end of the blade cuff. The first amount heat can be greater that the second amount of heat. Applying heat to the inboard and outboard ends of the blade cuff can include heating the bond to a temperature that is below a cure temperature of the rotor blade body. The rotor blade assembly can include an inboard end, an outboard end, and a mid-span segment coupling the inboard end to the outboard end. The blade cuff can have a first prong and a second prong, and the inboard end of the rotor blade body disposed between the first prong and the second prong. A first bond can couple the first prong of the blade cuff to first airfoil surface of the rotor blade body. A second bond can couple the second prong of the blade cuff to a second airfoil surface of the rotor blade body.

A rotor blade disassembly system includes a rotor blade cradle movable between continuous and cantilevered support positions, a blade cuff heater element disposed on an end of the cradle, a support withdrawal mechanism, and a blade cuff seat fixed relative to the blade cradle. The heater element is operably connected to a controller to apply heat to the blade cuff when the rotor blade cradle is in either or both the continuous support and cantilevered support positions.

In embodiments, the blade cradle can include an inboard support, an outboard support, and a mid-span interposed between the inboard support and the outboard support. The blade cuff seat can be disposed on a side of the inboard support opposite the mid-span support. The cantilevered support position can be varied in height below the continuous support position relative to gravity, such as due to droop of the rotor blade assembly. The blade cradle can define an open top slot conforming to the profile of a helicopter main rotor blade at the corresponding support station. The system can include a ram movable along an axis orthogonal relative to a withdrawal axis of the blade cradle between the continuous and cantilevered support positions.

These and other features of the systems and methods of the subject disclosure will become more readily apparent to those skilled in the art from the following detailed description of the preferred embodiments taken in conjunction with the drawings.

BRIEF DESCRIPTION OF THE DRAWINGS

So that those skilled in the art to which the subject disclosure appertains will readily understand how to make and use the devices and methods of the subject disclosure without undue experimentation, embodiments thereof will be described in detail herein below with reference to certain figures, wherein:

FIG. 4 is a side elevation view of the rotor blade assembly of FIG. 1 seated in a disassembly system, supports of the disassembly system continuously supporting the blade body along the span of the rotor blade assembly;

FIG. 5 is an axial end view of the rotor blade assembly and disassembly system of FIG. 4, showing the support in continuous support position and a cantilevered support position relative to airfoil profile of the blade body of the rotor blade assembly;

DETAILED DESCRIPTION OF THE PREFERRED EMBODIMENTS

Figure 1:
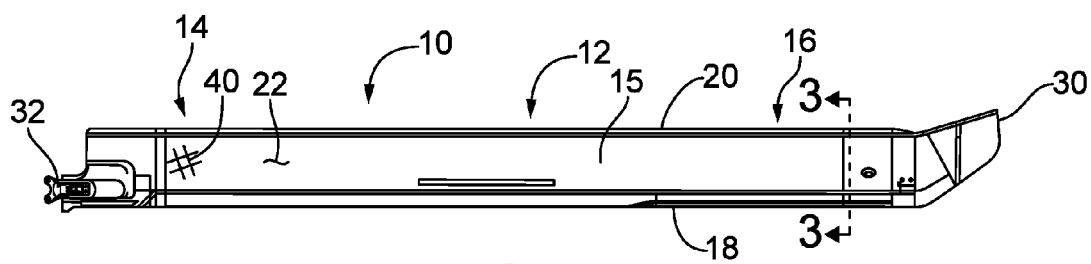
FIG. 1 is a spanwise plan view of a rotor blade assembly, showing a metallic blade cuff connected to a composite blade body.

Reference will now be made to the drawings wherein like reference numerals identify similar structural features or aspects of the subject disclosure. For purposes of explanation and illustration, and not for limitation, a rotor blade disassembly system according to an exemplary embodiment blade assembly in accordance with the disclosure is shown in FIG. 1 and is designated generally by reference character 100. Other embodiments of rotor blade disassembly systems and method of disassembling rotor blade assemblies in accordance with the disclosure, or aspects thereof, are provided in FIGS. 2-14, as will be described. The systems and methods described herein can be used removing blade cuffs from rotor assemblies for rotorcraft, however the invention is not limited to rotor blade assemblies with blade cuffs or to rotorcraft in general and may be applied to coupling mechanisms used in rotor blades or propellers such as those used in fixed wing aircraft, wind turbines, industrial machinery and the like.

Figure 2:
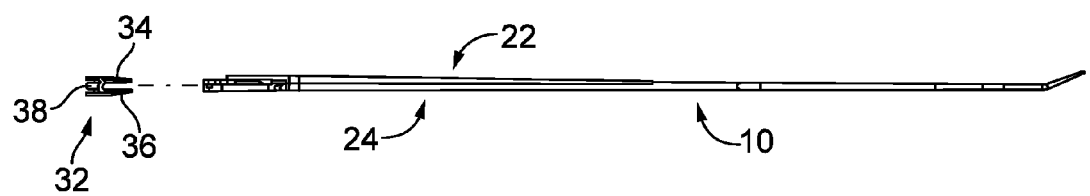
FIG. 2 is an spanwise exploded view of the rotor blade assembly of FIG. 1, showing the seat and prongs of the blade cuff.
Figure 3:
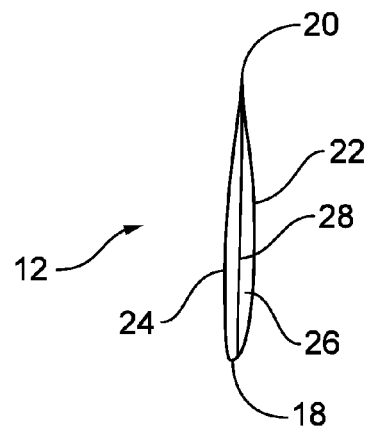
FIG. 3 is a chordwise cross-sectional view of the rotor blade assembly of FIG. 1, showing a chord defined by the airfoil profile of the blade body.

With reference to FIGS. 1-3, a rotor blade assembly 10 is shown. Rotor blade assembly 10 includes a blade body 12 having an inboard end 14, an outboard end 16, and a mid-span segment 15 connecting inboard end 14 to outboard end 16. Blade body 12 has a leading edge 18, a trailing edge 20, a first airfoil surface 22, and a second airfoil surface 24. First airfoil surface 22 extends chordwise between leading edge 18 and trailing edge 20. Second airfoil surface 24 is connected to first airfoil surface 22 at leading edge 18 and trailing edge 20, and is separated therebetween an airfoil profile 26 of blade body 12. Airfoil profile 26 defines a chord 28 that extends between leading edge 18 and trailing edge 20. A tip cap 30 is connected to outboard end 16 of blade body 12. A blade cuff 32 is connected to inboard end 14 of blade body 12 on a spanwise end of blade body 12 opposite tip cap 30, e.g., inboard end 14. Blade cuff 32 has metallic body with first prong 34, a second prong 36, and a root portion 38 configured to couple rotor blade assembly 10 to a hub of helicopter main rotor assembly. In the illustrated exemplary embodiment, blade body 12 includes a composite structure 40 to which blade cuff 32 is bonded. It is contemplated that rotor blade assembly 10 may include a composite spar 42 (shown in FIG. 6), composite spar 42 providing substantially all the rigidity in the chordwise plane of blade body 12. While described in terms of a blade cuff 32 with a metallic body, it is understood that other materials can be used for blade cuff 32, including combinations of metallic and composite materials.

With reference to FIGS. 1 and 4, a rotor blade disassembly system 100 is shown. Rotor blade disassembly system 100 includes a cradle 102, a cuff heater 104, a support displacement mechanism 106, and a blade cuff seat 108. Cradle 102 includes a plurality of support structures configured to provide spanwise support to blade body 12 in an orientation where blade body 12 is oriented horizontally relative to the direction of gravity. In the illustrated exemplary embodiment cradle 102 includes an outboard support 110, a mid-span support 112, and an inboard support 114 that are fixed relative to one another by a longitudinally extending frame 116. Inboard support 114 is disposed on a side of mid-span support 112 that is longitudinally opposite outboard support 110.

Figure 10:
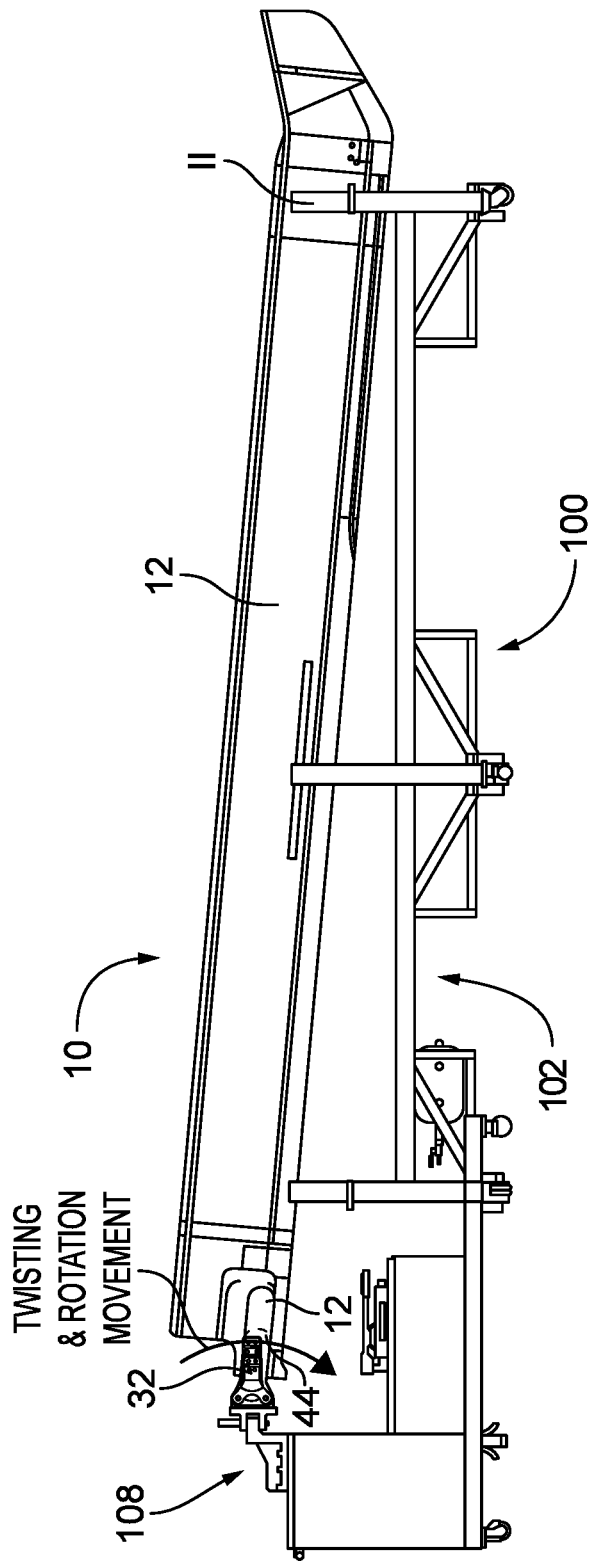
FIG. 10 is a side elevation view of the rotor blade assembly of FIG. 1 seated in a disassembly system, supports of the disassembly system displaced into the cantilevered support position.

With reference to FIGS. 1 and 5, the support structures, i.e. outboard support 110, mid-span support 112, and inboard support 114, are shown. The support structure each include blade slot 111 and are displaceable between a continuous support position I (solid outline) and a cantilevered support position II (shown in dashed outline). As illustrated, blade body is oriented in blade slot 111 with leading edge 18 facing downward. This positions an erosion protection structure arranged on leading 18 in a position to absorb the impact associated with the drop of blade body 12 when the bond between blade cuff 32 (shown in FIG. 1) and blade body 12 (shown in FIG. 1) fractures in shear (as shown in FIG. 10). However, it is understood that, in other aspects, blade slot 111 could support other elements of blade body 12, such as trailing edge 20 if disposed in blade slot 111.

With continuing reference to FIG. 4, in the continuous support position the support structures support rotor blade assembly 10 along its spanwise length in blade slot 111 horizontally relative to the direction of gravity. In the cantilevered support position, subsequent to the support structures displacing between the continuous support position I to the cantilevered support position II by operation of support displacement mechanism 106, rotor blade assembly 10 is supported endwise by blade cuff seat 108. It is contemplated that a displacement D or 'throw' of the support structures between the continuous support position I and the cantilevered support position II can be between about twenty (20) inches and about twenty-four (24) inches, thereby limiting the force with which the blade contacts the supports when the bond between blade cuff 32 (shown in FIG. 1) and blade body 12 (shown in FIG. 1) fractures in shear (as shown in FIG. 10). As will be appreciated by those of ordinary skill in the art in view of the present disclosure, the throw can be greater or less than this range, depending upon the stiffness and length the blade, 'soft' blades tending to droop more than stiff blades, longer blades tending to drop more than short blades.

In the illustrated exemplary embodiment, support displacement mechanism 106 includes a pneumatic release system and a compressor. It is to be understood and appreciated that this is for illustration purposes and is non-limiting; support displacement mechanism 106 can include a hydraulic drive, a hydraulic drive, or a discrete support element such a sling arrangement supported to a crane.

Figure 6:
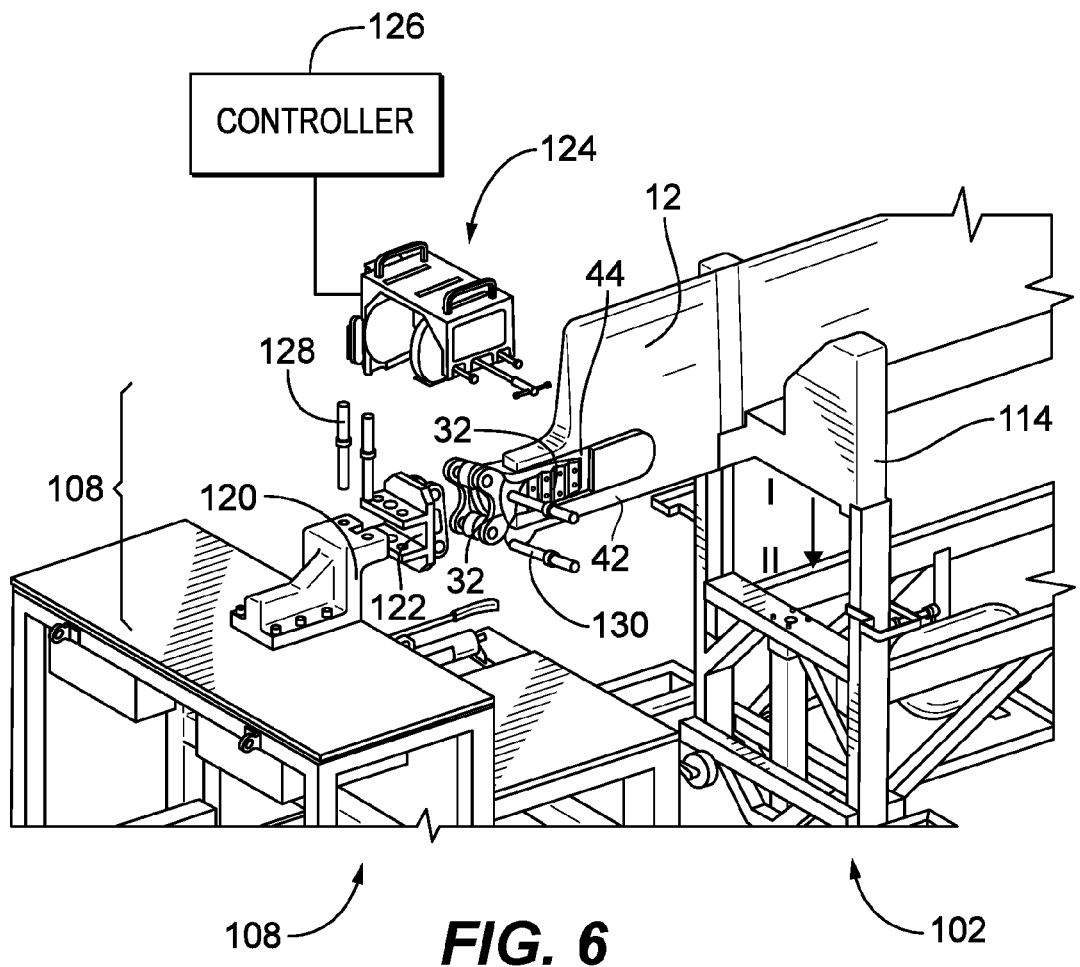
FIG. 6 is an exploded view of the blade cuff seat of the disassembly system shown in FIG. 4, showing a base, anti-rotation structure, and heater assembly of the blade cuff seat.

With reference to FIGS. 5 and 6, blade cuff seat 108 is shown. As indicated in the exploded view of FIG. 5, blade cuff seat 108 includes a base 120, an anti-rotation structure 122, a heater assembly 124, a heater controller 126, a first pin set 128, and a second pin set 130. Base 120 is fixed relative to cradle 102, and in this respect base 120 is fixed relative to the support structure in both the continuous support position I (shown in FIG. 5) and the cantilevered support position II (shown in FIG. 5).

First pin set 128 fixes anti-rotation structure 122 relative to base 120. In the illustrated exemplary embodiment this is accomplished with a plurality of horizontal (relative to the direction of gravity) flanges that mate with a vertical lug. A vertical flange on anti-rotation structure 122 is disposed on a side of anti-rotation structure 122 opposite first pin set 128 and has a cuff face configured to allow an inboard edge of blade body 12 to rotate against the flange while fixing blade cuff 32 relative to base 120, thereby allowing a bond 44 between blade cuff 32 and blade body 12 shears.

Blade cuff 32 seats in anti-rotation structure 122 and is rotatably fixed therein by second pin set 130. As will be appreciated by those of skill in the art in view of the present disclosure, when the support structures move between continuous support position I and cantilevered support position II, the weight of rotor blade assembly 10 is carried through bond 44 and blade cuff 32 to anti-rotation structure 122. Anti-rotation structure 122 transfers the load into base 120, thereby supporting blade body 12 in a cantilevered arrangement, loading bond 44 in shear.

Heater assembly 124 seats over blade cuff 32 and is operably connected to heater controller 126, and is configured and adapted to apply heat to bond 44 through the metallic body of blade cuff 32. As will be appreciated by those of skill in the art, heating bond 44 to a predetermined temperature weakens bond 44, rendering bond less able to carry the shear load exerted on bond 44 by blade body 12 when in the cantilevered support position II, and enabling bond 44 to shear at a predetermined temperature that is less that the cure temperature of blade body 12. This allows bond 44 to be fractured using only the load associated only with the weight of blade body 12 and at a temperature below which composite structure 40 (shown in FIG. 1) may be damaged by the heat generated by heater assembly 124. By way of example, where blade body 12 is a composite having a maximum short term operating temperature of about 149 degrees Celsius (about 300 degrees Fahrenheit) and bond 44 has an adhesive with a glass transition temperature of about 121 degrees Celsius (about 250 degrees Fahrenheit), heater assembly 124 heats bond 44 to at least the adhesive glass transition temperature (i.e. about 121 degrees Celsius) without heating blade body 12 to the maximum short term operating temperature (i.e. about 149 degrees Celsius).

While not limited thereto, the heat can be applied in the continuous support position I to weaken bond 44 prior to blade body 12 being placed in the cantilevered support position II. However, it is understood that the heat could also be applied while blade body 12 is also in the cantilevered support position II, such as where some amount of heat is used to ensure that bond 44 remains weakened.

Figure 7:
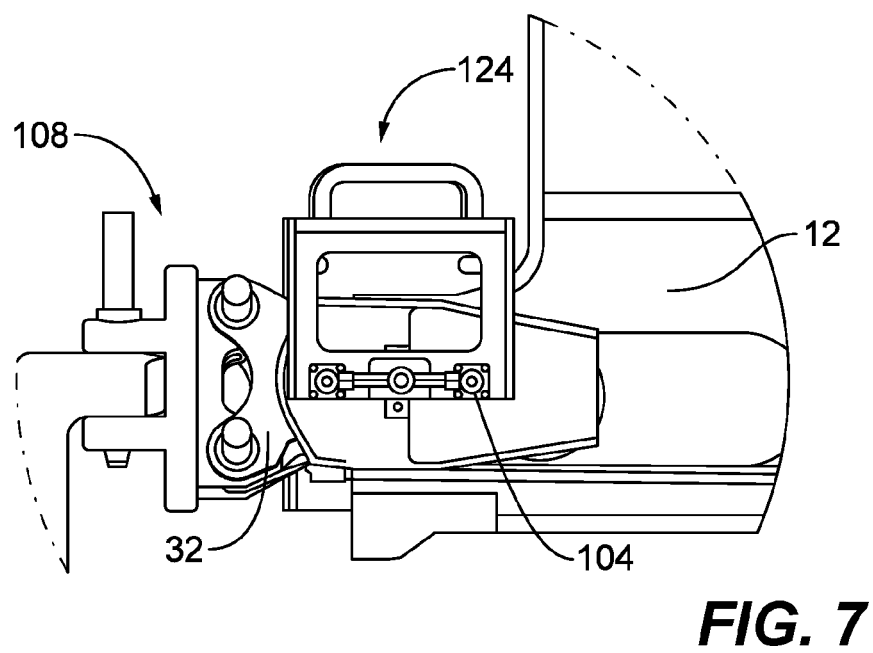
FIG. 7 is a side elevation view of the blade cuff seat of the disassembly system of FIG. 4, showing the heater assembly in thermal communication with the blade cuff.
Figure 8:
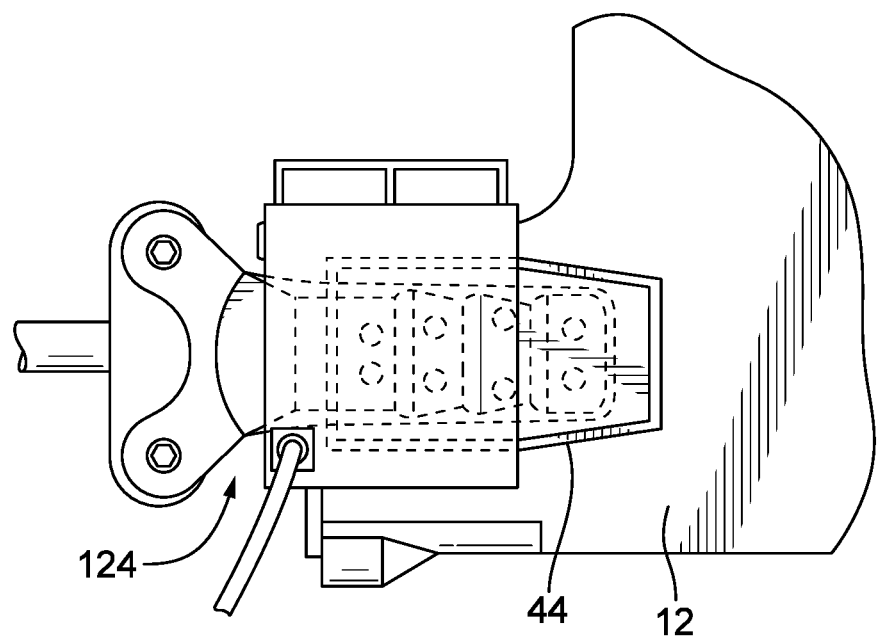
FIG. 8 is a side elevation view of the blade cuff seat of the disassembly system of FIG. 4, showing the heater assembly enveloping the prongs of the blade cuff.
Figure 9:
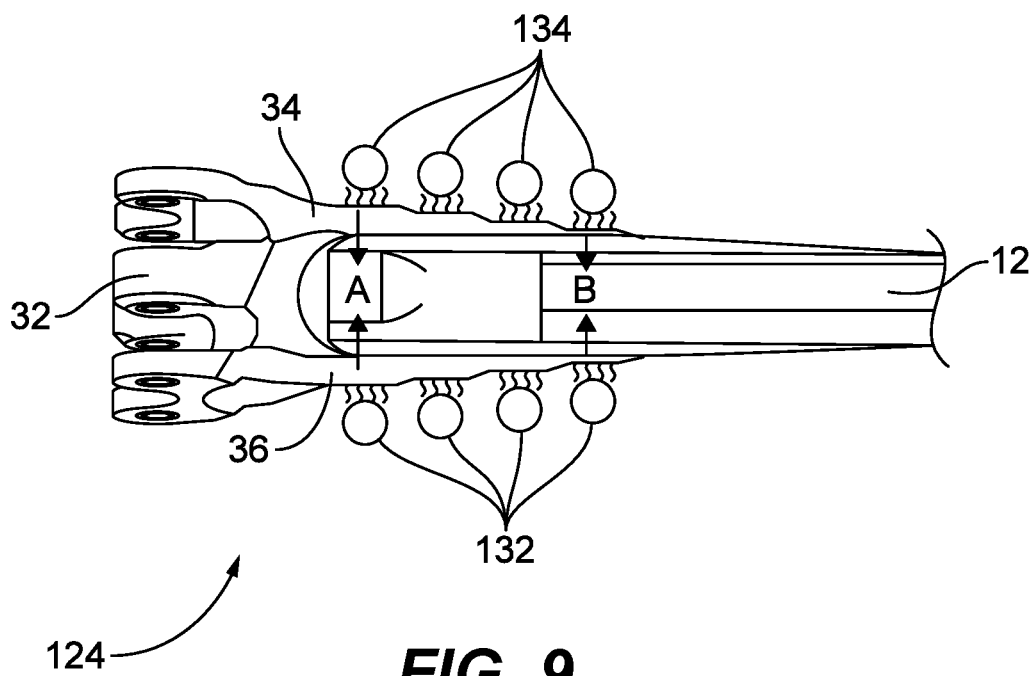
FIG. 9 is a schematic top view of the heater assembly of the disassembly system of FIG. 4, showing the heater elements in thermal communication with the blade cuff to apply different amounts of heat spanwise to the blade cuff.

With reference to FIGS. 7-9, heater assembly 124 is shown. Heater assembly 124 envelopes blade cuff 32 and includes one or more electrically powered heater elements 104 arranged longitudinally relative to blade cuff 32 along first prong 34 and second prong 36. In the illustrated exemplary embodiment, heater assembly 124 includes a first heater element bank 132 and a second heater element bank 134. First heater element bank 132 is disposed on a side of blade cuff 32 that is opposite second heater element bank 134.

First heater element bank 132 and second heater element bank 134 each include a plurality of longitudinally distributed heater elements 104 to apply different amounts of heat according to longitudinal position. For example, in the illustrated embodiment, blade cuff heater element 104 is configured and adapted to apply a greater amount of heat at first position A than a second position B, first position A corresponding to a spanwise portion of blade cuff 32 with a greater thermal mass than the thermal mass of a spanwise portion of blade cuff 32 disposed about second position B. This allows for uniform heating of bond 44 along its spanwise length irrespective of the different amounts of metallic material forming blade cuff 32 that the heat need traverse. Although four heater elements are shown in the illustrated exemplary embodiment, it is to be appreciated and understood that fewer or more heater elements can be employed, as suitable for a given application.

With reference to FIG. 10, rotor blade assembly 10 is shown captive in rotor blade disassembly system 100 as bond 44 fractures. Withdrawal of the support structures of cradle 102 to cantilevered support position II exerts a shear load on bond 44. Application of heat (shown in FIG. 9) to bond 44 progressively weakens bond 44 to a point where bond 44 can no longer resist the shear load imposed on bond 44 by the cantilevered arrangement, causing blade body 12 to twist and rotate relative to blade cuff 32—which remains fixed within blade cuff seat 108. This causes blade body 12 to drop into cradle 102.

Figure 11:
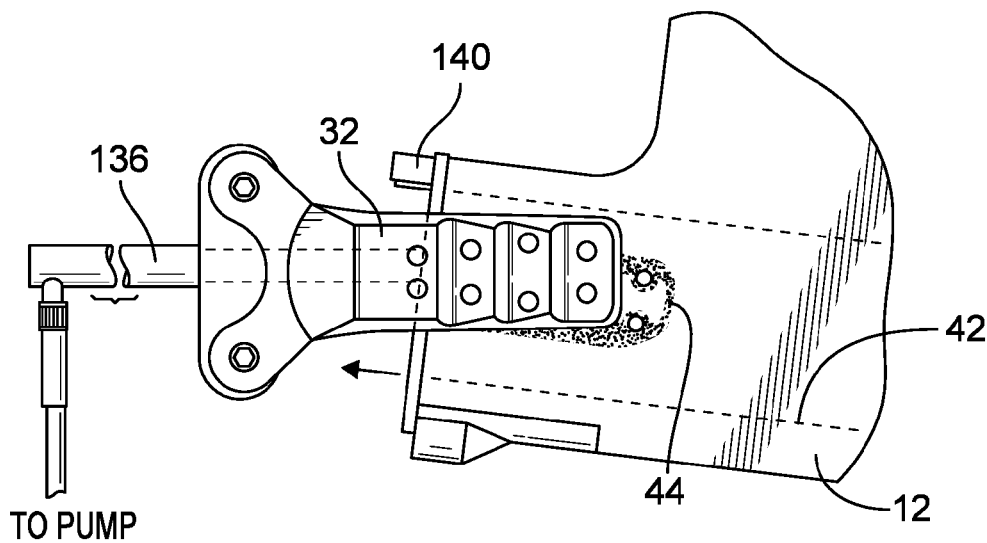
FIGS. 11-13 show the blade cuff being separated from the blade body subsequent to the bond between the cuff and blade body fracturing.
Figure 12:
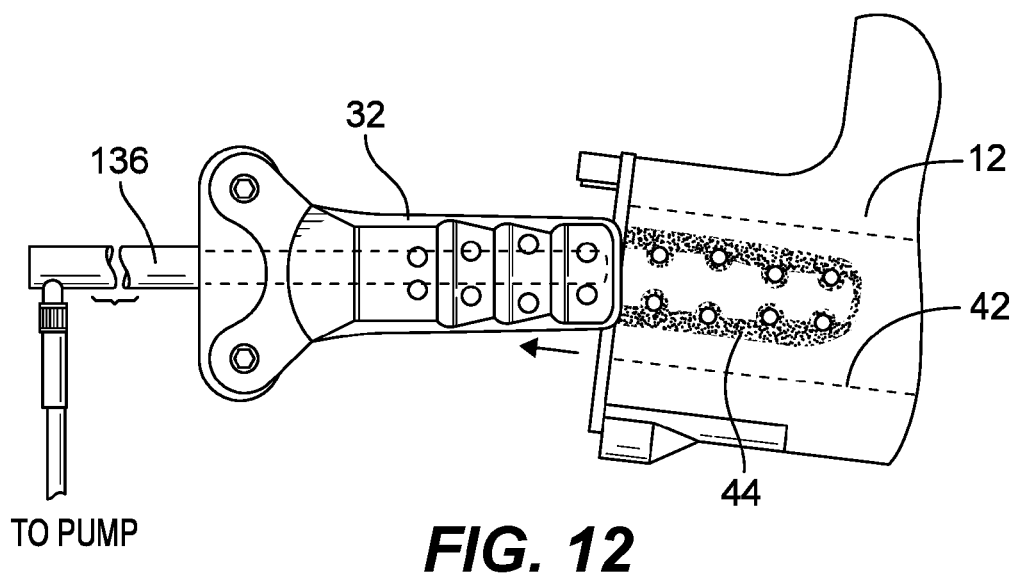
Figure 13:
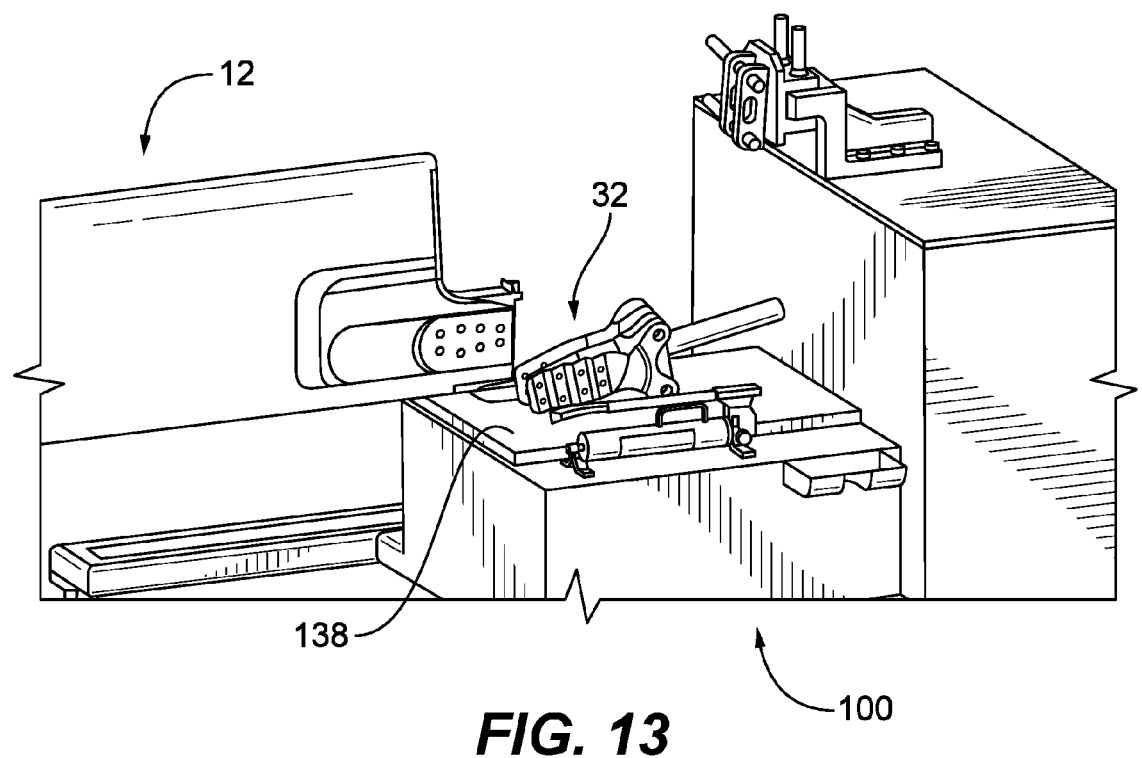

With reference to FIGS. 11-13, removal of blade cuff 32 is shown. Prior to heating bond 44, a root plate cover 140 with a semi-circular profile is seated over the inboard end of blade body 12. The semi-circular profile allows root plate cover 140 to be received within a space between blade body 12 and cuff 32. Once seated over the inboard end of blade body 12, root plate cover 140 protects the inboard end of blade body 12 by preventing blade body 12 from impacting blade cuff 32 when blade body 12 rotates relative to blade cuff 32 when bond 44 breaks. As will be appreciated by those of skill in the art, this prevents damage that could potentially occur to the composite blade body structure as outboard end 16 (shown in FIG. 2) of blade body 12 drops into cradle 102.

Root plate cover 140 also receives a longitudinal end of a ram 136, which hydraulically applies a spanwise force to composite spar 42, and distributes the force applied to displaced blade cuff 32 in the spanwise direction from blade body 12. A tray 138 can be used to support blade body 12 while blade cuff 32 is removed and to support blade cuff 32 as it separates from blade body 12. While shown as a ram 136, it is understood that other mechanisms, including manual devices, can be used to pull blade cuff 32 away from blade body 12.

Figure 14:
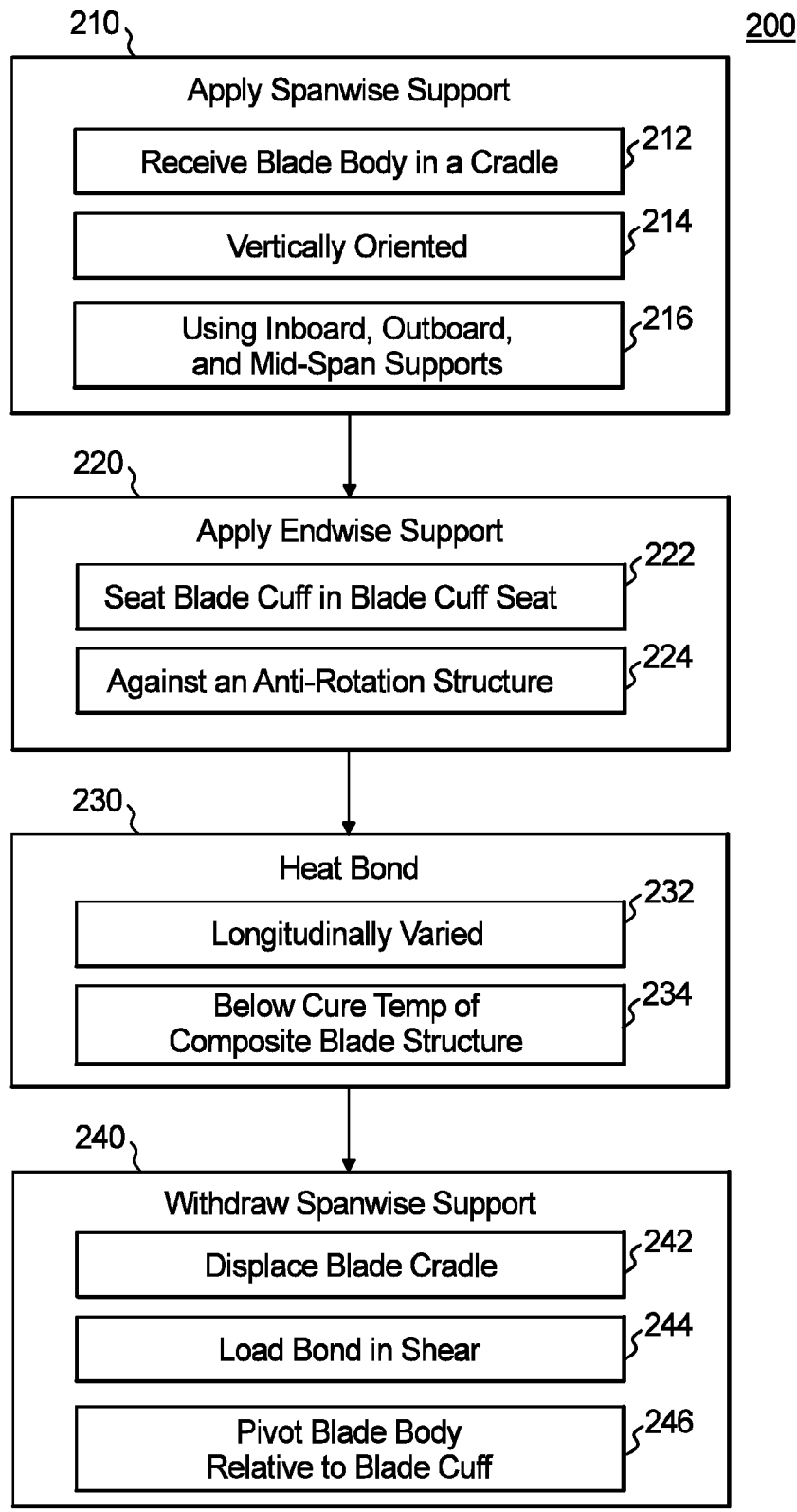
FIG. 14 is a schematic flow diagram of a method of separating a blade cuff from a rotor blade body, showing the steps of the method.

With reference to FIG. 14, a method 200 of disassembling a rotor blade assembly is shown. Method 200 generally includes applying spanwise support to a rotor blade body, e.g., blade body 12 (shown in FIG. 2), as shown with box 210. Method 200 also includes applying endwise support to the rotor blade body, as shown with box 220. Method 200 also includes applying heat to a bond, e.g. bond 44 (shown in FIG. 6), disposed on an end of the rotor blade body, as shown with box 230. Method 200 additionally includes removing spanwise support from the rotor blade body and exerting shear stress on the bond using the weight of the rotor blade body, as shown with box 240. Such exertion can be applied by allowing the outboard end of the rotor blade body to rotate relative to the inboard end.

Applying spanwise support to the rotor blade body includes receiving the rotor blade body in a blade cradle, e.g., cradle 102, as shown with box 212. The rotor blade body can be oriented in the blade cradle such that a chord defined by the profile of the rotor blade body is oriented vertically relative to the direction of gravity, as shown with box 214. The spanwise support can be applied by engaging the blade body using an inboard support, a mid-span support, and an outboard support of the blade cradle, e.g., inboard support 114, mid-span support 112, and outboard support 110, as shown with box 216. Thereafter, fasteners coupling the blade cuff to the rotor blade body are removed.

Method 200 further includes applied endwise support to the rotor blade body, as shown with box 220. Endwise support is applied to the rotor blade body by seating a blade cuff, e.g., rotor blade cuff 32 (shown in FIG. 2), to a blade cuff seat, e.g., blade cuff seat 108, as shown with box 222. It is contemplated that applying endwise support to the blade cuff can include seating the blade cuff against an anti-rotation structure, e.g., anti-rotation structure 38, of the blade cuff seat, as shown with box 224. The anti-rotation structure can be configured such that the inboard end of the rotor blade may pivot relative to the blade cuff without contacting the blade cuff.

Once the blade body is supported endwise, heat is applied to the bonds of the rotor blade assembly using a blade cuff heater element, e.g., blade cuff heater element 104 (shown in FIG. 3), as shown with box 230. Heating can varies along a longitudinal length of the blade cuff, for example by applying a first amount of the heat to an inboard end of the blade cuff, e.g., heat A (shown in FIG. 3), and applying a second amount of heat to an outboard end of the blade cuff, e.g. heat B (shown in FIG. 3), which is greater than the first amount of heat, as shown with box 232. This allow for heating the bond uniformly along the bond length notwithstanding longitudinal variation in the longitudinal span of the prongs of the blade cuff. It is contemplated that heating the bond can includes heating the bond to a temperature that is below a maximum short term operating temperature of a composite structure of the rotor blade body, e.g., composite spar 42 (shown in FIG. 3), as shown with box 234.

Withdrawing the blade cradle relative to the rotor blade body can include withdrawing the blade body downward relative to the rotor blade body, as shown with box 242. Displacement of the blade cradle is done subsequent to providing endwise support to the blade body, and may be done prior to heating the bond or while heating the bond. In certain embodiments, displacement of the blade cradle can be done subsequent to hearing the bond to a predetermined bond temperature where a shear load applied to the bond exceeds the shear strength of the bond, as shown with box 244. This causes the bond to fail using laterally applied shear force to the bond, the rotor blade body thereafter dropping into the blade cradle. As will be appreciated, application of shear load causes the bond to fail in shear once the shear load exceeds the shear stress of the bond, causing the blade to pivot (or rotate) relative to the blade cuff, as shown with box 246.

The methods and systems of the present disclosure, as described above and shown in the drawings, provide for rotor blade assembly disassembly methods and systems with superior properties including the capability disassembly composite blades coupled to metallic blade cuffs. While the apparatus and methods of the subject disclosure have been shown and described with reference to preferred embodiments, those skilled in the art will readily appreciate that changes and/or modifications may be made thereto without departing from the scope of the subject disclosure.

What is claimed is:

1. A rotor blade disassembly method for removing a blade cuff from a rotor blade body, comprising:
   applying a spanwise support to the rotor blade body, horizontally, in a first position;
   heating a bond connecting the blade cuff to an end of the rotor blade body;
   removing the spanwise support from the rotor blade body such that the rotor blade body is in a second position other than the first position;
   exerting shear stress on the heated bond using weight of the rotor blade body while in the second position; and
   removing the blade cuff from the rotor blade body.

2. The disassembly method as recited in claim 1, wherein applying spanwise support to the rotor blade body further comprises receiving the rotor blade body in a blade cradle.

3. The disassembly method as recited in claim 2, wherein the applying spanwise support to the rotor blade body further comprises engaging the rotor blade body against an inboard support, a mid-span support, and an outboard support of the blade cradle.

4. The disassembly method as recited in claim 3, further including disengaging one or more of the inboard support, the mid-span support, and the outboard support from the rotor blade body.

5. The disassembly method as recited in claim 1, wherein the heating the bond comprises:
   applying a first amount of heat to an inboard end of the blade cuff coupled to the rotor blade body by the bond; and applying a second amount of heat to an outboard end of the blade cuff, wherein the first amount of heat is greater than the second amount of heat.

6. The disassembly method as recited in claim 5, wherein the applying the first amount of heat to the inboard end and outboard end of the blade cuff includes heating the bond to a temperature below a maximum short term operating temperature of the rotor blade body.

7. The disassembly method as recited in claim 1, wherein the applying spanwise support to the rotor blade body comprises orienting a chord defined by the rotor blade body vertically relative to the direction of gravity.

8. The disassembly method as recited in claim 1, further comprising applying endwise support to the rotor blade body.

9. The disassembly method as recited in claim 1, further comprising seating the blade cuff coupled to the rotor blade body by the bond in a cuff seat, and pivoting the rotor blade body relative to the blade cuff using the weight of the rotor blade body.

10. The disassembly method as recited in claim 1, further comprising exerting an opposed axial forces against the cuff and the rotor blade body, and displacing the blade cuff axially relative to the blade body.

11. The disassembly method as recited in claim 1, further comprising removing fasteners coupling the blade cuff to the rotor blade body.

12. The disassembly method as recited in claim 1, wherein the rotor blade comprises:
   a composite blade body with an inboard, an outboard end, and an intervening mid-span segment defined between first and second airfoil surfaces; and
   the blade cuff having first and second prongs disposed on the inboard end of the composite blade body,
   wherein the bond includes a first bond layer coupling the first prong of the blade cuff to the first airfoil surface of the composite blade body,
   wherein the bond includes a second bond layer coupling the second prong of the blade cuff to the second airfoil surface of the composite blade body.

13. The disassembly method as recited in claim 1, further including seating a root plate cover over an inboard end of the rotor blade.

\* \* \* \* \*